J. N. KELLY.
STEERING MECHANISM.
APPLICATION FILED OCT. 18, 1917.

1,291,017.

Patented Jan. 14, 1919.
4 SHEETS—SHEET 1.

Inventor
Joseph N. Kelly,
By Toulmin & Toulmin,
Attorneys

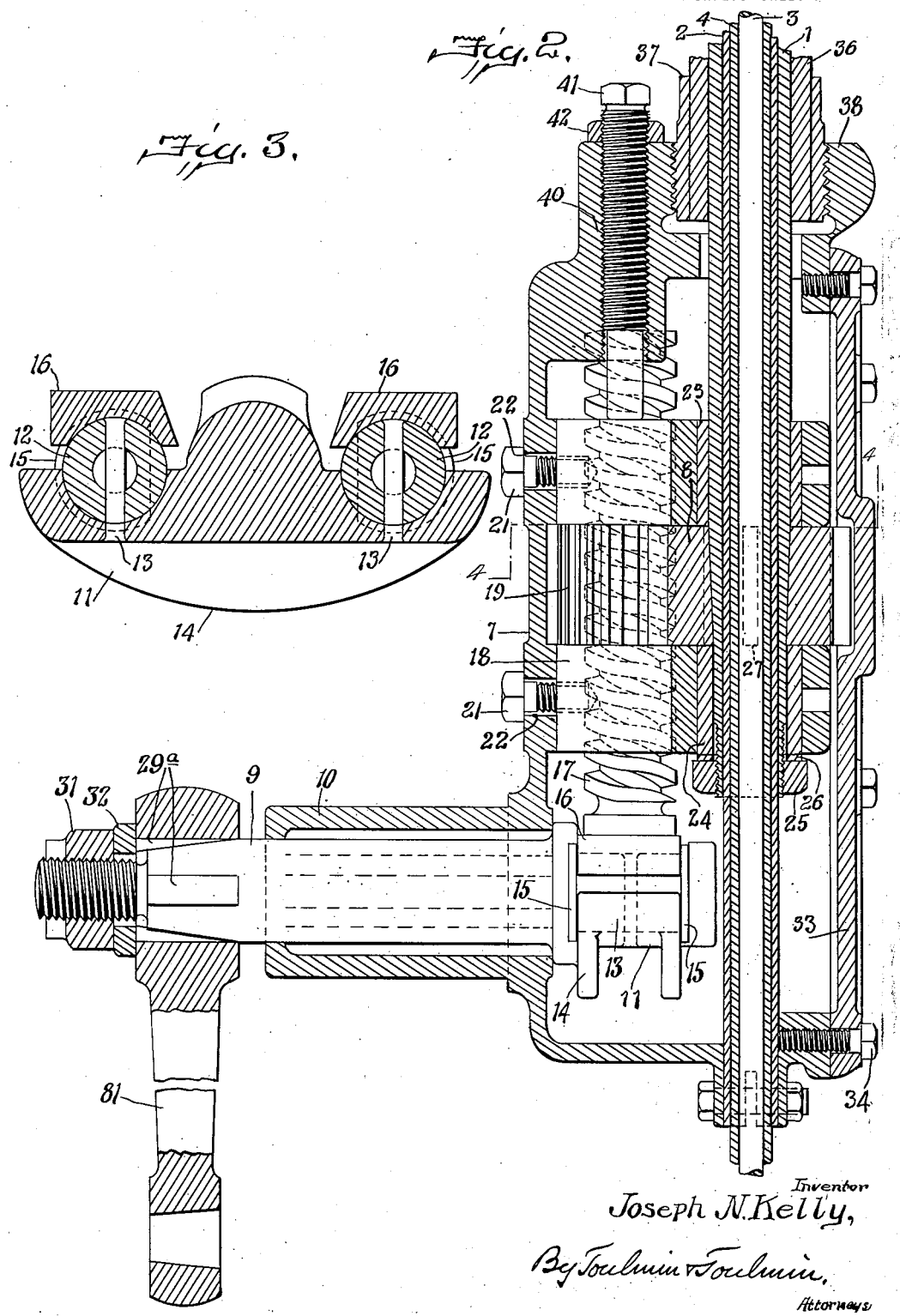

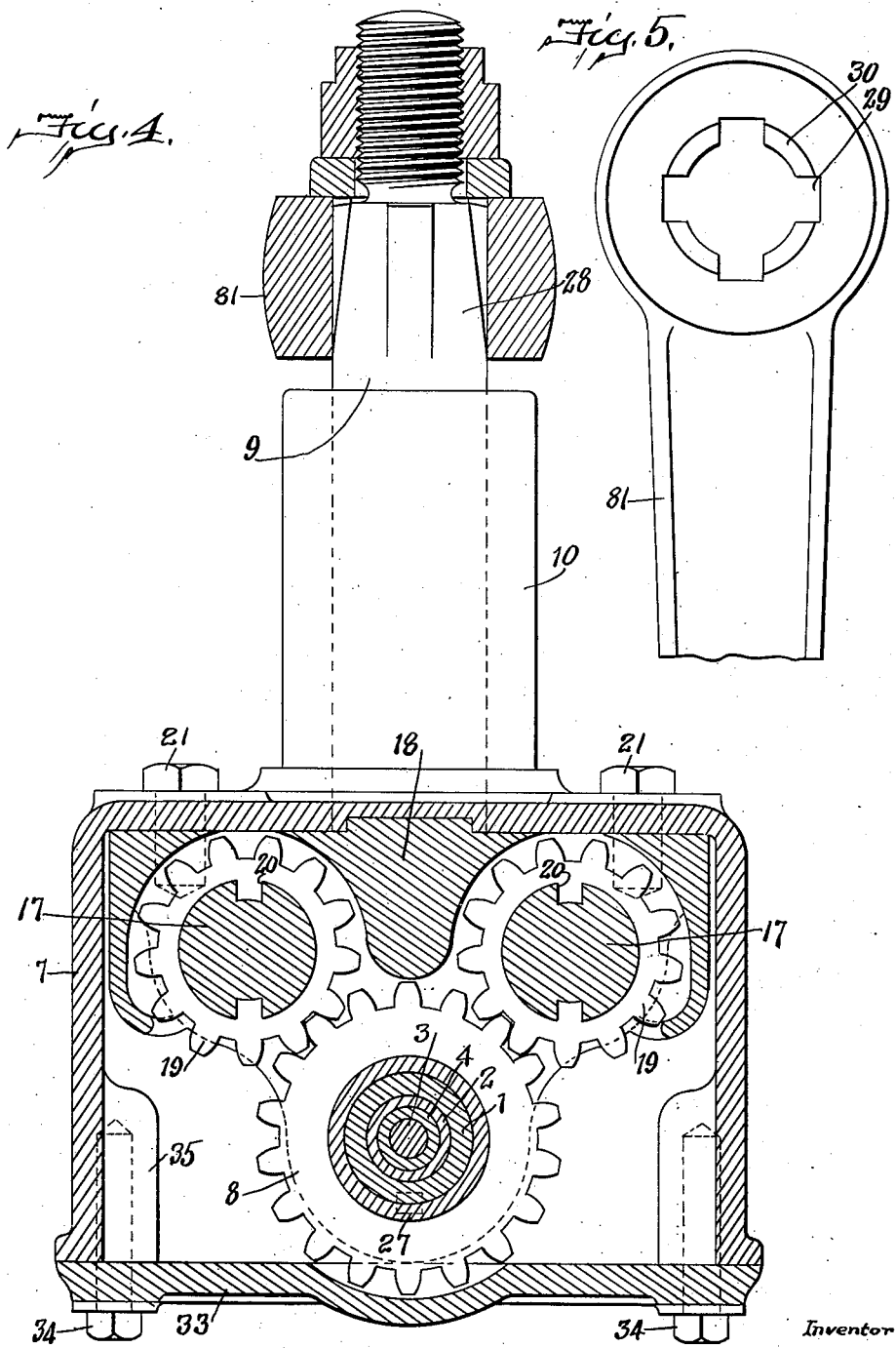

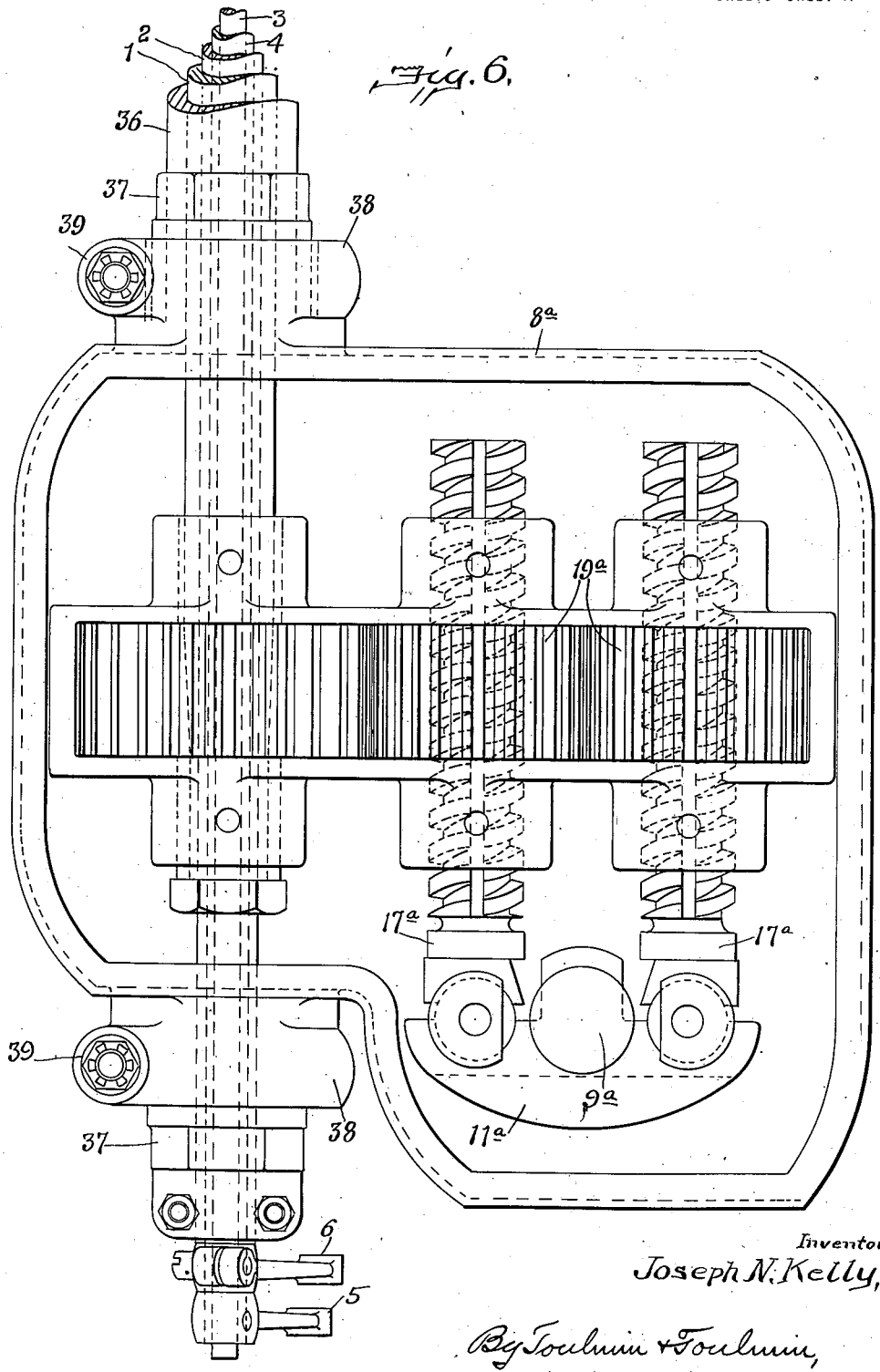

UNITED STATES PATENT OFFICE.

JOSEPH N. KELLY, OF DAYTON, OHIO.

STEERING MECHANISM.

1,291,017.  Specification of Letters Patent.  Patented Jan. 14, 1919.

Application filed October 18, 1917. Serial No. 197,219.

*To all whom it may concern:*

Be it known that I, JOSEPH N. KELLY, a citizen of the United States, residing at Dayton, in the county of Montgomery and State of Ohio, have invented certain new and useful Improvements in Steering Mechanism, of which the following is a specification, reference being had therein to the accompanying drawing.

This invention relates to steering mechanism, particularly adapted for automobiles, but usable in other relations. The main object of the invention is to provide a stronger steering gear easily adjustable for wear and reversible for right or left hand drive.

A further object is to provide such a steering gear having substantially no lost motion and having provisions whereby lost motion occurring through wear of the parts may be readily and completely taken up. To accomplish this end the thrust of the steering mechanism is always in one direction and the thrust bearings are mounted so that they may be readily and easily adjusted.

An additional object is to provide a steering gear wherein there are many screw threads in contact, thus giving a large wearing surface and causing wear to take place very slowly.

In the drawings, Figure 1 is a plan view of the device, part of the casing being omitted;

Fig. 2 is a longitudinal section centrally of the device;

Fig. 3 is a detail view showing the rocker arm and the shoes engaging therewith;

Fig. 4 is a transverse vertical section on the line 4—4 of Fig. 2;

Fig. 5 is a detail showing part of the steering arm; and

Fig. 6 is a plan view like Fig. 1, but showing a modified form of the device.

Figure 1:
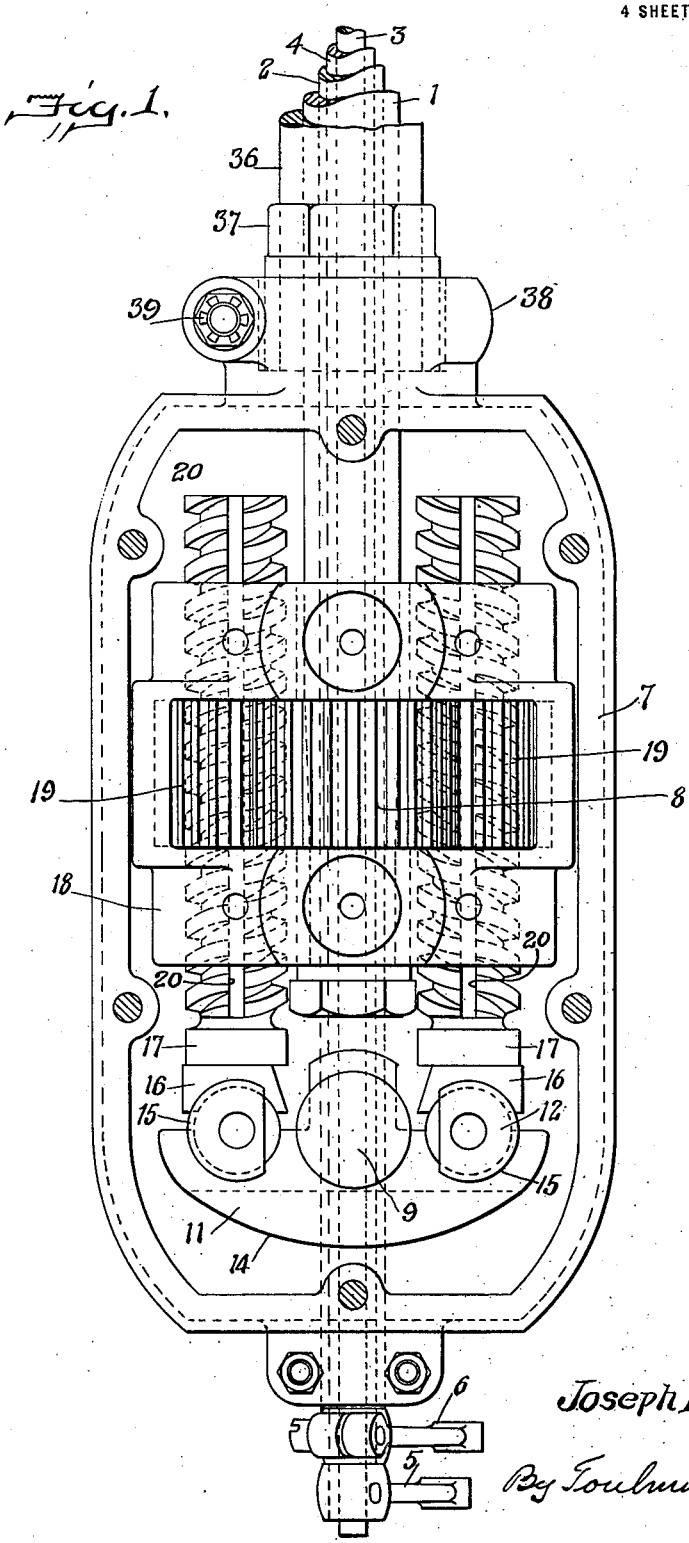

The present practice in automobile steering mechanisms is to provide a worm on the steering post meshing with a worm sector to which the steering arm is attached. The difficulty with this construction is that it is extremely hard to take up wear of the parts and because of this it is customary to employ a complete worm wheel instead of a worm sector and provide means whereby the entire wheel may be adjusted to bring a new series of teeth into mesh with the worm on the shaft. The present invention avoids the objection found to the former constructions by providing large screws engaging a rocker arm to which the steering arm is attached, the construction being such that the screws may be readily adjusted as a whole and the thrust being always in one direction.

In Fig. 1 there is shown at the top of the figure a sleeve 1 which is driven by the automobile steering wheel. This sleeve surrounds a stationary sleeve 2 to which in practice the sector over which the hand throttle and the spark control lever move is fast. The shaft 3 may be connected to the spark control lever and a sleeve 4 be operated by the hand throttle for the fuel. At the other end of the device the shaft 3 is provided with an arm 5 controlling the spark advance and the sleeve 4 has fast to it an arm 6 controlling the supply of fuel. The sleeve 1 extends into the casing 7 which surrounds the mechanism of the device and has fast thereon a large gear 8 shown well in Fig. 4.

Fig. 2 shows the steering arm 81 fast to a rocker arm 9 which is guided and supported by an integral extension 10 of the casing 7. At the other end of the rocker shaft 9 from that to which the steering arm 81 is attached there is fast to the shaft 9 a rocker arm 11, projecting in opposite directions from the shaft 9, as shown in Fig. 1, and having its opposite portions provided with bearing spools 12. As shown these spools are separate from the rocker arm 11 and are connected thereto by pins 13 passing substantially through the spools and into an angle portion of the rocker arm 11. As shown in Fig. 2, the arm 11 is provided with strengthening flanges 14.

The spools 12 are provided at their opposite ends with circular flanges 15 and the spools and flanges might be constructed integrally with the rocker arm 11 as they have no movement relative thereto. Their construction as separate elements is purely for manufacturing reasons.

Held between the flanges 15 of the spools 12 and riding on the cylindrical surface of these spools are shoes 16 which have opposite flat faces engaging the flat ends of screws 17. These screws are shown as oppositely threaded and are double threaded screws in the construction shown. Single threaded screws may, of course, be used.

A large nut 18 is adjustably held to the casing 7 as will be later described and the screws 17 pass through the separated portions of this nut. Thus a large bearing surface for the screws is obtained and the screws move in straight lines through the nut 18.

The large gear 8 previously referred to is held against lateral movement by the separated parts of the nut 18 and this gear engages with pinions 19 splined to the screws 17. As shown in Fig. 1 the screws 17 have longitudinal cuts 20 and in these cuts a projection or key from the pinions 19 may ride. It will be noted that the gears 19 are carried between the separated parts of the nut 18 and thus are maintained properly in line with the large gear 8.

When the sleeve 2 is rotated by the steering wheel the gear 8 is correspondingly turned and thus the pinions 19 are rotated to similar extents and in the same direction. The oppositely threaded screws 17 thus rotate with the pinions 19, but the threads of the nut 18 compel the screws to move longitudinally in opposite directions. In Fig. 1 the particular screw 17 which moves to the left engages the shoe 16 and pushes against it, thereby rocking the rocker arm 11 and the rocker shaft 9 and thus moving the steering arm 81 which, of course, is connected to the steering wheels of the vehicle. When the rocker arm 11 is moved by one of the screws the shoe 16 at the other end of the arm is compelled to follow the screw 17 which then recedes or moves toward the right in Fig. 1 and thus a constant contact between both shoes 16 and the corresponding screws 17 is maintained. The bearing spools 12 which are really part of the rocker arm rotate relative to the shoes 16 and during the movement of the rocker arm 11 a slight movement of the shoes 16 toward and away from the sleeve 2 is produced, thus sliding the shoes 16 slightly relative to the abutting ends of the screws 17. This movement is very slight and both the shoes 16 remain constantly in engagement with the ends of the screws 17.

To limit the movement of the screws 17 they are positioned so as to engage the right hand end of the casing 7 in Fig. 1. Thus, the steering sleeve 1 may be rotated until one of the screws 17 strikes the end of the casing and then no further movement of the steering wheel can be given.

It will be seen that the area of contacting surface between the threads of the screw 17 and the threads of the nut 18 is large in extent and thus wear of the parts will be very slow. There is, therefore, no lost motion between the steering wheel and the rocker shaft 9, at least, until the parts have considerably worn. When such wear occurs it may be readily taken up by a bodily movement of the nut 18 in the casing 7.

To this end the nut 18 is held to the casing by bolts 21 which pass through slots 22 in the casing, these slots being somewhat elongated in the direction of the longer diameter of the casing, the bolts passing into the nut 18. Therefore, if wear of the parts occurs the bolts 21 may be loosened and the entire nut 18 and the screws 17 be moved toward the rocker arm 11 until both screws again engage closely with the shoes 16. Then the bolts 21 are again tightened in the new position on the casing and thus the wear is entirely taken up.

It will be observed that the gear 8 is a spur gear and that the pinions 19 are spur pinions. These three elements are held between the two separated parts of the nut 18 and there is no longitudinal thrust occurring on the gear or the pinions. The nut 18 takes the entire thrust of the screws 17 and the wear due to the thrust will consequently all take place in the threads of the screws 17 and the nut 18. The screws 17 move in straight lines at all parts of their travel and both screws constantly engage closely with the shoes 16.

In order to provide bearings for the gear 8 in the nut 18 the construction shown in Fig. 2 may be employed. Here the steering sleeve 1 passes through bearing pieces 23 and 24 in the nut 18. As shown the steering sleeve 1 is slightly reduced in diameter as it passes through the gear 8 and maintains the smaller diameter inside the sleeve 24. The gear 8 is correspondingly cut so as to fit the tapered portion of the sleeve 1. The bearing sleeve 23 fits the steering sleeve 1 tightly so that the steering sleeve may turn with the sleeve 23. The sleeve 24, however, is made to fit the reduced portion of the sleeve 1 loosely and does not require a driving force to adjust it over the steering sleeve. It rotates with the steering sleeve and may be tightened against the gear 8 by a nut 25 engaging a threaded portion of the sleeve 1 provided, if desired, with an intervening washer 26. When the sleeve 24 is adjusted on the steering sleeve 1 it presses the gear 8 to the right of Fig. 2, thus producing a tight fit of the gear on the steering sleeve 1. Of course, this movement is produced by tightening the nut 25. If desired a key way may be cut in the steering sleeve 1 and a key 27 shown in Fig. 4 be employed to compel the gear 8 to rotate with the sleeve 1.

The construction thus described is for the purpose of permitting easy withdrawal of the gear 8 if that is necessary. The fact that the gear is entirely inside the nut 18 might make it difficult to withdraw the gear unless some such construction was provided. With the construction shown the nut 25 may be loosened, the sleeve 24 withdrawn and then the key 27 may readily be detached from the gear 8 whereupon the steering sleeve 1 may be pulled out of the device so as to release the gear 8.

As a matter of further improvement a novel construction for connecting the steering arm 81 to the rocker shaft 9 is provided. To this end the shaft 9 is provided with cut away portions at the point near its end where the steering arm 81 is attached. These cut away portions indicated by the numeral 28 taper toward the center of the shaft as the end of the shaft is approached. Between these cut away portions are portions 29, the surfaces of which are parallel to the axis of the shaft and their sides are parallel to each other. The steering arm 81 is correspondingly cut, the portions 29ª being maintained the full distance from the center of the shaft 9 and having parallel sides at right angles to the axis of the shaft. Between these portions 29ª are portions 30 tapered in the same way as the portions 28 of the shaft so as to fit closely thereon when the steering arm is inserted over the shaft 9, as shown in Fig. 2. The end of the shaft 9 is threaded to receive a nut 31 which may engage a washer 32, thus pressing the steering arm 81 axially of the shaft 9 until a tight fit occurs.

In Fig. 1 the top of the casing 7 has been removed but this part appears in Fig. 4, indicated by numeral 33, and it is held to the casing 7 by bolts 34 passing into bosses 35 of the casing. The removal of this portion 33 permits ready access to all the parts of the device.

It will be understood that the removal of the adjustable bolts 21 permits the entire nut 18 to be withdrawn from the casing 7. This feature permits the device to be reversed so as to be usable either with left or right hand drive. In order to change the driving connections the screws 17 may each be reversed in the nut 18 and then the whole nut be reversed in the casing 7. The device is symmetrical and the bolts 21 are placed, as shown, so as to permit this. By performing the operation just described the feature of having the screws oppositely movable is maintained, but the direction of their movement relative to the steering wheel or the steering sleeve 1 is reversed and thus a reverse movement of the steering arm 8 is obtained and the device is readily adjustable for right or left hand drive.

In the modified form of Fig. 6 the casing 8ª is somewhat differently shaped and the screws 17ª and pinions 19ª are shown as being both on the same side of the driving gear 8ª. In this case the screws are similarly threaded and the construction is otherwise generally the same as in the form of Fig. 1.

In the modified form the screws 17ª rotate in opposite directions and thus cause rocking of the rocker shaft 9ª and the rocker arm 11ª precisely as was the case in the form of Fig. 1. All of the advantages of the form of Fig. 1 are retained in the modified form of Fig. 6.

As shown in both forms the steering post is surrounded by a stationary sleeve 36 passing into and being held by a nut 37. A collar 38 may be an integral portion of the casing 7, the collar being split and the parts pressed together by a nut 39, thus maintaining the sleeve 36 in proper position. In the form of Fig. 6 the casing 8ª is made symmetrical at the points where the steering post passes through it and thus the device may be reversed so that the steering sleeve 1 enters the casing from the opposite side. As shown, a second collar 38 and nut 37 is provided to permit this function.

In order to control accurately the movement of the nut 18 in adjusting it relative to the casing 7 the device shown in Fig. 2 may be employed. Here the casing 7 is provided with a boss 40 through which a screw 41 is threaded, this screw engaging with the side of the nut 18 and being held against movement by a lock nut 42. Thus to adjust the nut 18 for the purpose of taking up wear the lock nut 42 may be released and the loosening of the holding bolts 21 then permits the screw 41 to be turned and a movement of the nut 18 and the screws 17 relative to the casing given thereby. Then the tightening of bolts 21 and the lock nut 42 prevents further movement of the parts.

The rocker arm 11 was stated to be fast to the rocker shaft 9. While these may be separate elements, they may be, and are shown as, integral, and may in practice be desirably made as a single shop forging, the shaft portion being properly machined to fit the casing extension 10 and the arm portion being fitted to the spools 12. The combined device may be readily removed from the casing 7 after the cover 33 is taken off.

The construction is well adapted to accomplish the objects above stated. The wearing surface of the nut 18 and screws 17 is large, because of the number of threads in contact, and thus wear takes place slowly. If wear does occur it may readily and completely be taken up by adjustment of the nut 18, and, therefore, no lost motion between the steering wheel and the vehicle wheels need occur at any time.

The device is constructed to be readily adapted to right or left hand drive by mere reversal of parts, and the commercial advantage of producing one set only of parts is obvious.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a steering gear, the combination, with a sleeve connected to a steering wheel to be driven thereby, of a gear fast to said sleeve, two pinions separately meshing with said gear, oppositely threaded screws splined respectively to said pinions, a rocker arm movable in opposite directions by said screws, and means connected to said rocker arm to turn the steering wheels of a vehicle.

2. In a steering gear, the combination, with a gear having connections to be driven by a steering mechanism, two pinions separately meshing with said gear, oppositely threaded screws splined respectively to said pinions, a rocker shaft, a rocker arm pivoted to said shaft and positioned to be moved in opposite directions by said screws, and connections from said rocker shaft to turn the steering wheel of a vehicle.

3. In a steering gear, the combination, with a gear having connections to be driven by a steering mechanism, two pinions separately meshing with said gear, oppositely threaded screws splined to said pinions, a rocker arm having bearing portions, shoes movable on said bearing portions and engaging said screws, and connections from said rocker arm to turn the steering wheel of a vehicle.

4. In a steering gear, the combination, with a centrally pivoted rocker arm, and screws engaging said arm on opposite sides of its pivot, of pinions splined respectively to said screws, a gear meshing with said pinions, means for rotating said gear, and connections from said rocker arm to turn the steering wheel of a vehicle.

5. In a steering gear, the combination, with a centrally pivoted rocker arm, and oppositely threaded screws engaging said arm on opposite sides of its pivot, pinions splined to said screws, a stationary nut having threaded portions engaged by the threads of both said screws, a gear meshing separately with said pinions, means for rotating said gear, and connections from said rocker arm to the steering wheel of a vehicle.

6. In a steering gear, the combination, with a pivoted rocker arm, and screws engaging said arm and constituted to rock it in opposite directions, pinions splined to said screws, a gear meshing with said pinions, means for rotating said gear, connections from said rocker arm to turn the steering wheels of a vehicle, and a casing against which the ends of said screws abut to stop their travel.

7. In a steering gear, the combination, with a centrally pivoted rocker arm having bearing portions, of two oppositely threaded screws, shoes held against said bearing portions by the ends of said screws, a nut common to said screws and having oppositely threaded portions engaging the threads of said screws, a gear maintained in mesh with said pinions and supported by said nut, means for rotating said gear, connections from said rocker arm to turn the steering wheels of a vehicle, and devices for limiting the travel of said screws.

8. In a steering gear, the combination, with a centrally pivoted rocker arm having bearing spools, of shoes having one side shaped to engage said spools, oppositely threaded screws positioned so that their ends constantly and slidably engage the faces of said shoes, a nut common to said screws and having threaded portions engaged by the threads of the screws, means for similarly rotating said screws in said nuts, and connections from said rocker arm to the steering wheels of a vehicle.

9. In a steering gear, the combination, with a pivoted rocker arm, of oppositely threaded screws connected to rotate said arm in opposite directions, a nut common to the screws and having threaded portions engaging the threads of said screws, means for similarly rotating said screws, and a casing supporting said rocker arm and said nut, with means for adjusting said nut relative to said casing and said arm.

10. In a steering gear, the combination, with a rocker arm having bearing portions, of oppositely threaded screws engaging said bearing portions on opposite sides of said rocker arm, a nut having two separated parts each having threaded portions engaging the threads of said screws, spur pinions splined to said screws and positioned between the separated parts of said nut, a gear also positioned between the parts of said nut and meshing with said pinions, means for rotating said gear, connections from said rocker arm to turn the steering wheel of a vehicle, and a casing in which said nut is adjustably mounted.

11. In a steering gear, the combination, with a rocker arm having connections to turn the steering wheel of a vehicle, of a casing, a nut adjustably mounted on said casing and having a threaded portion, a screw having threads engaging the threaded portion of said nut, and positioned so that its end engages and rotates the rocker arm, and a screw passing through the casing and engaging said nut, whereby to adjust the nut relative to the casing.

12. In a steering gear, the combination, with a rocker arm, and a casing in which said arm is mounted, of oppositely threaded screws having a constant diameter and engaging opposite portions of said rocker arm, a symmetrical nut having threaded portions in which said screws turn, and bolts detachably mounting said nut in the casing, the detachment of the bolts permitting reversal of the screws in the nuts and reversal of the nuts relative to the casing.

13. In a steering gear, the combination, with a pivoted rocker arm, having bearing portions each comprising a cylindrical spool with end flanges, of a shoe for each bearing having one face curved to fit the cylindrical surface of one of said spools and the other face flat, screws having flat ends at right angles to the axis of said screws, each screw constantly engaging the flat face of one of said shoes, connections from the steering gear of a vehicle to rotate said screws, and devices driven by said rocker arm to turn the steering wheel of the vehicle.

14. In a steering gear, the combination, with a pivoted rocker arm, and screws engaging the same to rotate it on its pivot, of a combined thrust block and nut through which said screws move as they are rotated, spur pinions splined to said screw and held against lateral movement by the sides of said nut, means for turning said pinions, and connections from the rocker arm to turn the steering wheel of a vehicle.

15. In a steering gear, the combination, with a steering arm having connections to the wheels of a vehicle, and a rocker arm connected to said steering arm, of screws constantly engaging opposite sides of said rocker arm, pinions splined to said screws, a gear for operating said pinions, and connections from the vehicle steering wheel to rotate said gear.

16. In a steering gear, the combination, with a pivoted rocker arm having connections to the wheels of a vehicle, of screws constantly engaging said rocker arm on opposite sides of its pivot, a nut through which said screws pass, having threads engaging the threads of the screws, pinions held by said nut and splined to said screws, and means, connected to the vehicle steering wheel, for rotating said pinions and said screws to equal extents.

In testimony whereof I affix my signature.

JOSEPH N. KELLY.